US006581900B1

(12) United States Patent
Stoecklein

(10) Patent No.: US 6,581,900 B1
(45) Date of Patent: Jun. 24, 2003

(54) VALVE FOR CONTROLLING LIQUIDS

(75) Inventor: Wolfgang Stoecklein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 09/831,224

(22) PCT Filed: Sep. 9, 2000

(86) PCT No.: PCT/DE00/03137

§ 371 (c)(1),
(2), (4) Date: May 8, 2001

(87) PCT Pub. No.: WO01/23742

PCT Pub. Date: Apr. 5, 2001

(30) Foreign Application Priority Data

Sep. 30, 1999 (DE) ........................................ 199 46 831

(51) Int. Cl.[7] ................................................ F16K 31/12
(52) U.S. Cl. ....................................... 251/57; 239/102.2
(58) Field of Search ............................. 251/57; 239/88, 239/89, 90, 95, 96, 102.2

(56) References Cited

U.S. PATENT DOCUMENTS

| | | | | | |
|---|---|---|---|---|---|
| 5,806,766 | A | * | 9/1998 | Krueger et al. | 239/124 |
| 5,875,764 | A | | 3/1999 | Kappel | |
| 6,142,443 | A | * | 11/2000 | Potschin et al. | 123/472 |
| 6,390,384 | B1 | * | 5/2002 | Sato et al. | 239/533.12 |

FOREIGN PATENT DOCUMENTS

| | | | |
|---|---|---|---|
| DE | 37 04 739 | A | 6/1988 |
| DE | 198 02 495 | A | 12/1998 |
| DE | 198 07 903 | A | 9/1999 |
| EP | 0 477 400 | A | 4/1992 |

* cited by examiner

*Primary Examiner*—Ehud Gartenberg
*Assistant Examiner*—Melvin A. Cartagena
(74) *Attorney, Agent, or Firm*—Michael J. Striker

(57) ABSTRACT

A valve for controlling liquids is embodied with a piezoelectric unit (3) for actuating a valve member (2) that is axially displaceable in a bore (8) of a valve body (9). The valve member (2), which has at least one control piston (7) and at least one actuating piston (10), is assigned a valve closing member (13), which cooperates with at least one valve seat (16, 17) provided on the valve body (9) for opening and closing the valve (1), and which divides a low-pressure region (16) at.system pressure from a high-pressure region (17). A hydraulic chamber (11) between the control piston (7) and the actuating piston (10) functions as a tolerance compensation element for the piezoelectric unit (3) and as a hydraulic step-up means. To compensate for leakage losses, a filling device (23) is provided, which can be made to communicate with the high-pressure region and which has a system pressure chamber (24, 26, 26') that discharges into a gap (25'), surrounding the actuating piston (10), or into a gap (25), surrounding the control piston (7).

11 Claims, 2 Drawing Sheets

VALVE FOR CONTROLLING LIQUIDS

PRIOR ART

Figure 1:
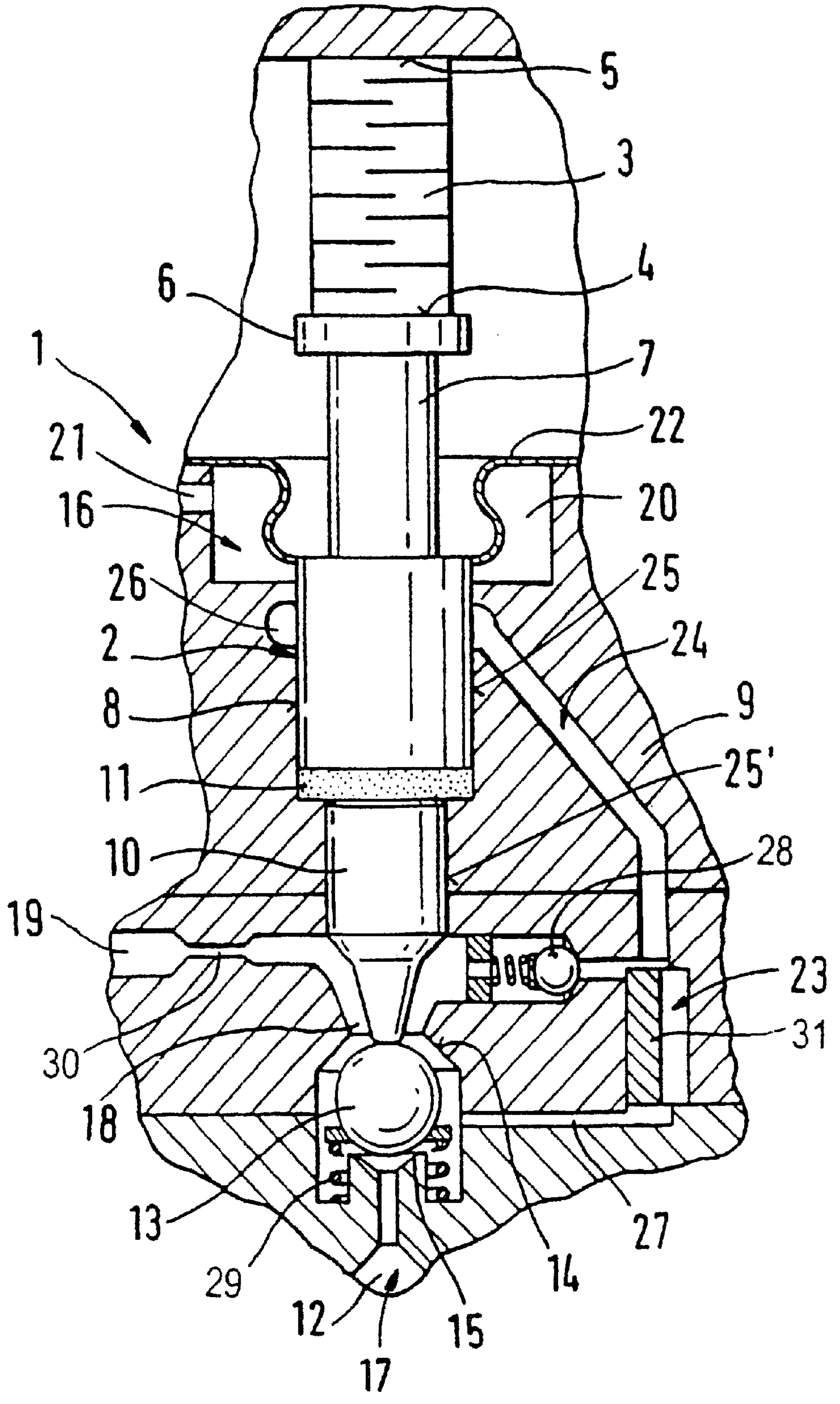

The invention relates to a valve for controlling liquids as defined in further detail in the preamble to claim 1.

From European Patent.Disclosure EP 0 477 400 A1, a valve is already known which is actuatable via a piezoelectric actuator. This known valve has an arrangement for an adaptive mechanical tolerance compensation, effective in the stroke direction, for a travel transformer of the piezoelectric actuator, in which the deflection of the piezoelectric actuator is transmitted via a hydraulic chamber.

The hydraulic chamber, which functions as a so-called hydraulic step-up means, encloses a common compensation volume between two pistons defining this chamber, of which one piston is embodied with a smaller diameter and is connected to a valve member to be triggered, and the other piston is embodied with a larger diameter and is connected to the piezoelectric actuator. The hydraulic chamber is fastened between the two pistons in such a way that the actuating piston of the valve member, which piston is retained in its position of repose by means of one or more springs relative to a predetermined position, executes a stroke that is increased by the step-up ratio of the piston diameter when the larger piston is moved a certain travel distance by the piezoelectric actuator. The valve member, piston and piezoelectric actuator are located one after the other on a common axis.

Via the compensation volume of the hydraulic chamber, tolerances caused by temperature gradients in the component or different coefficients of thermal expansion of the materials used and possible settling effects can be compensated for without causing a change in position of the valve member to be triggered.

Compensating for changes in length of the piezoelectric actuator, the valve member or the valve housing by means of the hydraulic chamber disposed between two pistons requires a complicated construction, however, and is problematic in terms of the incident leakage losses and the refilling of the hydraulic chamber. Specifically, the hydraulic coupler requires a system pressure, which drops because of leakage if adequate refilling with hydraulic liquid is not done.

In the industry, in common rail injectors, versions are known in which the system pressure is expediently generated in the valve itself, and a constant system pressure is assured even upon system starting. To that end, hydraulic liquid is drawn from a high-pressure region of the fuel to be controlled and delivered to the low-pressure region at the system pressure. This is done with the aid of leakage gaps, which are defined by leakage or filling pins. However, the leakage losses are often undesirably high, which is a disadvantage.

In versions with a hydraulic step-up means, the highest possible system pressure in the low-pressure region is advantageous. However, then it is often a problem that sealing elements, which seal off the piezoelectric actuator, which as a rule is not fuel-resistant, from the low-pressure region, can withstand only slight pressure, and therefore rapid refilling at elevated pressure cannot be employed.

The object of the invention is to create a valve for controlling liquids which in particular allows slight leakage from the low-pressure region and enables filling of a hydraulic step-up means at elevated pressure.

ADVANTAGES OF THE INVENTION

The valve of the invention for controlling liquids and having the characteristics of claim 1 has the advantage that upon triggering of the piezoelectric unit, only an extremely slight volume is positively displaced out of the system pressure region, so that the continuous leakage of the system, with the valve of the invention, is reduced to a minimum, yet a continuous flow through the hydraulic chamber and thus flushing out of any air that may have entered it are always assured.

The refilling of the hydraulic chamber can advantageously take place at high pressure, so that the fastest possible refilling is achieved. Especially with a valve embodied as a fuel injection valve, the time interval between fuel injections can thus be kept very slight, and as a result high engine speeds can be achieved.

Furthermore, the volume having the system pressure in the low-pressure region can be made quite small. This shortens the required time for filling the system region upon system starting.

A significant advantage of the invention is also that because of the separate disposition of the system pressure chamber, pressure surges on a sealing element that is optionally provided between the low-pressure region and the piezoelectric unit are avoided. Thus in the valve of the invention, the service life of the sealing element is favorably affected, and the magnitude of the system pressure is not limited by the sealing element.

Since a pumping effect with the sealing element and resultant high leakage losses from the system pressure region upon triggering of the piezoelectric unit are averted, the piston diameter and the sealing element can be selected freely without having to take into consideration a possible effective pumping area of the sealing element.

Further advantages and advantageous features of the subject of the invention can be learned from the specification, drawing and claims.

DRAWING

Two exemplary embodiments of the valve of the invention for controlling liquids are shown in the drawing and described in further detail in the ensuing description. Shown are FIG. 1, a schematic, fragmentary view of a first exemplary embodiment of the invention in a fuel injection valve for internal combustion engines, in longitudinal section; and FIG. 2, a schematic view of a second, fragmentary exemplary embodiment, in a fuel injection valve in longitudinal section.

DESCRIPTION OF THE EXEMPLARY EMBODIMENTS

The first exemplary embodiment shown in FIG. 1 illustrates a use of the valve of the invention in a fuel injection valve 1 for internal combustion engines of motor vehicles. The fuel injection valve 1 is embodied here as a common rail injector, and the fuel injection is controlled via the pressure level in a valve control chamber 12, which is connected to a high-pressure supply.

For setting an injection onset, injection duration, and injection quantity via force ratios in the fuel injection valve 1, a multiple-piece valve member 2 is triggered via a piezoelectric unit, embodied as a piezoelectric actuator 3 and disposed on the side of the valve member 2 toward the valve control chamber and the combustion chamber. It is understood that a plurality of piezoelectric actuators 3 can also be used with the valve 1.

The piezoelectric actuator 3 is made up of multiple layers, and on its side toward the valve member 2 it has an actuator head 4 and on its side remote from the valve member it has an actuator foot 5, which is braced on a wall of a valve body 9. Via a bearing 6, a control piston 7 of the valve member 2 rests on the actuator head 4.

The valve member 2 is disposed axially displaceably in a bore 8, embodied as a longitudinal bore, of the valve body 9 and along with the control piston 7 also has an actuating piston 10 that actuates a valve closing member 13; the end of the actuating piston 10 toward the valve closing member is embodied frustoconically. The control piston 7 and the actuating piston 10 have different diameters, and the ends adjacent one another define a hydraulic chamber 11 acting as a hydraulic step-up means.

The hydraulic chamber 11 is filled with a hydraulic liquid, and in the present exemplary embodiment fuel is used as the hydraulic liquid. Through the hydraulic chamber, the elongation of the piezoelectric actuator 3 is transmitted to the actuating piston 10.

Between the two pistons 7 and 10 defining it, of which the actuating piston 10 is embodied with a smaller diameter and the control piston 7 is embodied with a larger diameter, the hydraulic chamber 11 encloses a common compensation volume.

The hydraulic chamber 11 is fastened in such a way between the control piston 7 and the actuating piston 10 that the actuating piston 10 of the valve member 2 executes a stroke that is lengthened by the step-up ratio of the piston diameter when the larger control piston 7 is moved a certain travel distance by the piezoelectric actuator 3. The valve member 2, control piston 7, actuating piston 10 and piezoelectric actuator 3 are located one after the other on a common axis.

Via the compensation volume of the hydraulic chamber 11, tolerances from temperature gradients or different coefficients of thermal expansion of the materials used and possible settling effects can be compensated for, without causing any change in the position of the valve member 2 to be triggered.

On the end of the valve member 2 toward the valve control chamber, the spherical valve closing member 13 cooperates with valve seats 14, 15 embodied on the valve body 9; the valve closing member 13 divides a low-pressure region 16 at a system pressure from a high-pressure region 17 at a high pressure or rail pressure.

The valve seats 14, 15 are embodied in a valve chamber 18 formed by the valve body 9, and a leak drainage conduit 19 leads away from the valve chamber. The valve chamber 18 furthermore has a connection, formed by the lower valve seat. 15, with the valve control chamber 12 in the high-pressure region 17, the valve control chamber being merely indicated in the drawing.

A movable valve control piston, not further shown in the drawing, is disposed in the valve control chamber 12. By axial motions of the valve control piston in the valve control chamber 12, which typically communicates with an injection line that communicates with a high-pressure storage chamber (common rail) that is common to a plurality of fuel injection valves and supplies an injection nozzle with fuel, the injection performance of the fuel injection valve 1 is controlled in a manner known per se.

Adjoining the bore 8 on the piezoelectric end of the valve member 2 is a leak drainage chamber 26, which is defined on one side by the valve body 9 and on the other by a sealing element 22, connected to the first piston 7 of the valve member 2 and to the valve body 9; a leakage line 21 leads away from the leak drainage chamber 20. The sealing element 22 in this case is embodied as a bellowslike diaphragm and prevents the piezoelectric actuator 3 from coming into contact with the fuel contained in the low-pressure region 16. Naturally, the sealing element can also be embodied as a corrugated tube or the like.

Via a gap 25 surrounding the control piston 7, or a gap 25' surrounding the actuating piston 10, a slight leakage from the hydraulic chamber 11 is possible.

Since the hydraulic chamber 11 must be refilled during an interval in triggering or supplying current to the piezoelectric actuator 3, compensation for a leakage quantity from the low-pressure region 16 is provided for by withdrawing hydraulic liquid from the high-pressure region 17. A filling device 23 is used for this purpose and has a system pressure chamber 24, which is disposed in the valve body 9. The system pressure chamber 24 is embodied as a conduit, which communicates fluidically via a leakage pin 31 with the valve control chamber 12 of the high-pressure region 17; the leakage pin 31 is fitted into a bore in such a way that a predetermined leakage into the system pressure chamber 24 is made possible.

Naturally it can also be provided in an alternative version that instead of the leakage pin 31, a throttle bore serves as a throttle for the filling device 23; the diameter of the throttle bore is designed such that a volumetric flow from the high-pressure region 17, which flow passes through the throttle bore, compensates, at a defined minimum high pressure, for the leakage quantity from the low-pressure region 16.

In the version of FIG. 1, the system pressure chamber or conduit 24 discharges into the gap 25 surrounding the control piston 7. In the discharge region into the gap 25, the system pressure chamber 24 is embodied with an annular conduit 26, which is disposed coaxially with the control piston 7.

The gap 25 in the bore 8 between the control piston 7 and the wall of the-valve body 9 serves as communication between the annular conduit 26 and the hydraulic chamber 11, so that refilling of the hydraulic chamber 11 with fuel takes place without further provision from the annular conduit 26 in the event of sufficient leakage.

It is understood that still other structural designs of the system pressure chamber are conceivable. However, an annular design with an annular conduit is advantageous, because in this way a uniform filling of the hydraulic chamber 11 is achieved.

On the side of the throttle bore 28 toward the high-pressure region 17, a connecting conduit 27 discharges into the valve chamber 18.

On the end of the system pressure chamber 24 toward the leakage pin 31 or the valve chamber 18, a spring-loaded over-pressure valve 28 is provided, which leads into the valve chamber 18 and serves to provide that a predetermined system pressure, which is as constant as possible, is maintained in the system pressure chamber 24.

The fuel injection valve 1 of FIG. 1 functions as follows.

In the closed state of the fuel injection valve 1, that is, when the piezoelectric actuator 3 has no electric current, the valve closing member 13 of the valve member 2 is kept in contact with the upper valve seat 14 assigned to it, by means of the high pressure or rail pressure in the high-pressure region 17, so that no fuel from the valve control chamber 12 communicating with the common rail can reach the valve chamber 18 and then escape through the leak drainage conduit 19.

Thus if the valve control chamber 12 is not relieved, no fuel injection takes place through the injection nozzle. Upon relief of the valve control chamber 12, the valve closing member 13 is kept in an outset position on the upper valve seat 14 by a spring 29.

In the event of a slow actuation, as occurs upon a temperature-dictated change in length of the piezoelectric actuator 3 or other valve components, such as the valve member 2 or the valve body 9, the control piston 7 upon an increase in temperature penetrates the compensation volume of the hydraulic chamber 11, or upon a temperature drop retracts from it, without this having any overall effects on the closing and opening position of the valve member 2 and of the fuel valve 1.

If an injection through the fuel injection valve 1 is to take place, the piezoelectric actuator 3 is supplied with current, which causes it to increase its axial length abruptly. Upon this kind of fast actuation of the piezoelectric actuator 3, the piezoelectric actuator is braced on the valve body 9 acting as a counterpart bearing, and as a result the actuating piston 10 moves the valve closing member 7 from its upper valve seat 14 into a middle position between the two valve seats 14, 15.

Upon triggering of the valve member 2, a slight quantity of fuel is positively displaced out of the hydraulic chamber 11 through the gap 25' around the actuating piston 10 into the valve chamber 18. Since the pressure in the annular chamber 26 is relatively high, the hydraulic chamber can be refilled immediately from this chamber via the gap 25, as soon as fuel escapes in the form of leakage into the valve chamber 18.

In the open position of the valve closing member 13, fuel at high pressure can flow out of the valve control chamber 12 into the valve chamber 18. By means of a throttle provided in the leak drainage conduit 19, a brief pressure elevation in the valve chamber 18 is achieved, and as a result a hydraulic counterforce is exerted on the valve closing member 13 counter to the control motion of the valve member 2. The control motion is thus damped accordingly, so that the valve closing member 13 is stabilized in the middle position between the two valve seats 14, 15.

After pressure reduction by the throttle 30, the valve closing member 13 can be moved into its closing position on the lower valve seat 15, and as a result no further fuel from the valve control chamber 12 reaches the valve chamber 18. The fuel injection is thus terminated again.

After that, the current supply to the piezoelectric actuator 3 is interrupted, causing the piezoelectric actuator to become shorter again, and the valve closing member 13 is brought to the middle position between the two valve seats 14, 15, and another fuel injection takes place. Fuel can enter the valve chamber 18 through the lower valve seat. The pressure does not reduce immediately again, because of the throttle 30 disposed in the leak drainage conduit 19; instead, by a brief pressure increase in the valve chamber 18, a hydraulic counterforce is built up, which slows down the control motion of the valve member 2 in such a way that the valve closing member 13 is stabilized in its middle position.

After the pressure reduction in the valve chamber 18 through the leak drainage conduit 19, the valve member 13 moves into its closing position on the upper valve seat 14. The fuel that escaped from the hydraulic chamber 11 upon triggering of the valve member 2 is immediately replaced from the annular chamber 26 via the gap 25.

Each time the piezoelectric actuator 3 is triggered, which can be attained by supplying current and not supplying current in alternation, a fuel injection and a requisite refilling of the hydraulic chamber 11 take place with the valve 1 of the invention.

Figure 2:
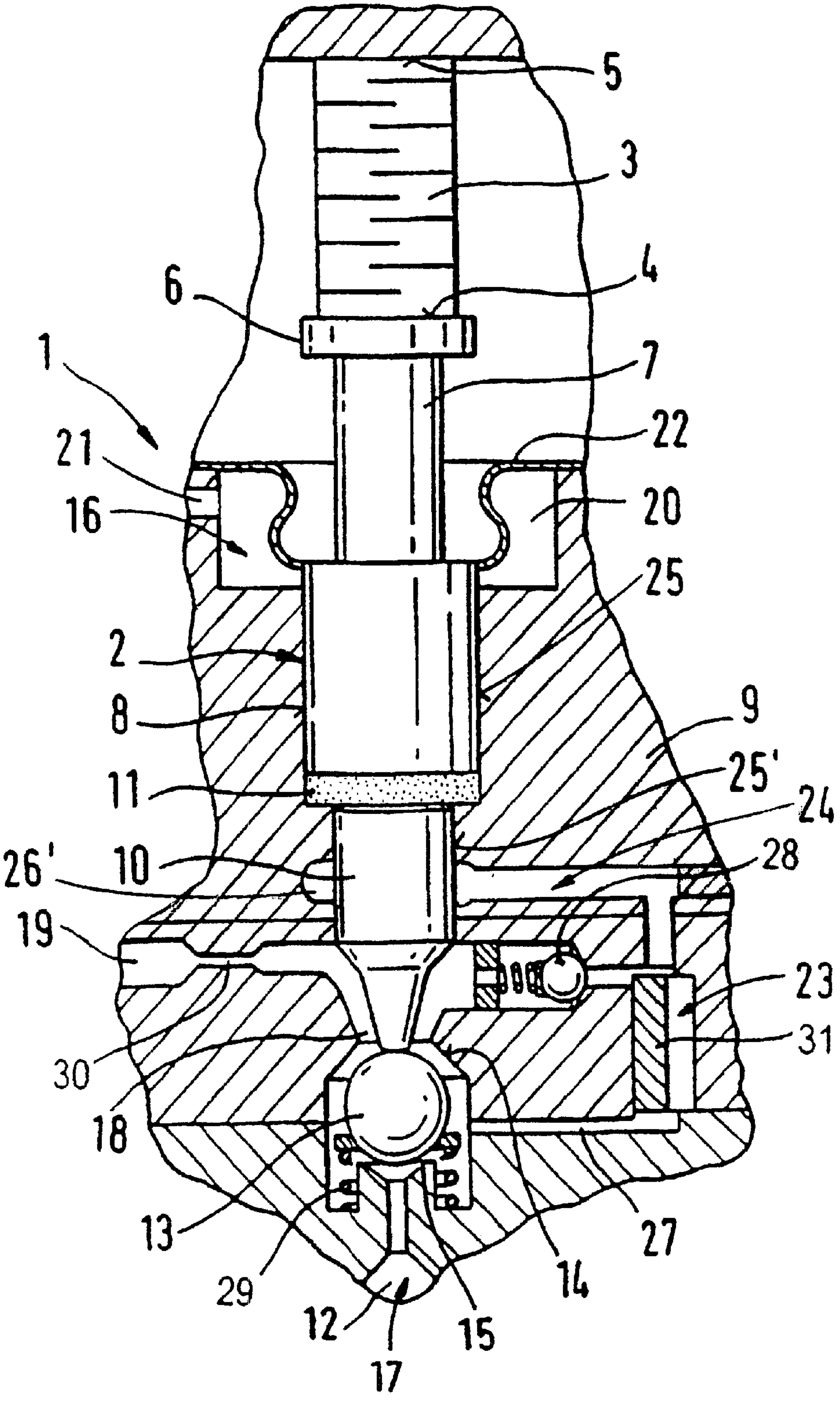

In FIG. 2, a second exemplary embodiment of the fuel injection valve 1 is shown, in which for the sake of simplicity functionally identical components are assigned the same reference numerals as in FIG. 1.

Compared to the version of FIG. 1, the fuel injection valve 1 shown here differs in that the system pressure chamber 24 of the filling device 23 discharges into the gap 25' around the actuating piston 10, and once again in the discharge region an annular conduit 26' disposed coaxially with the actuating piston 10 is provided.

In this exemplary embodiment, upon triggering of the valve member 2, fuel from the hydraulic chamber 11 is positively displaced into the leak drainage chamber 20 via the gap 25. From the annular conduit 26', via the gap 25', the hydraulic chamber is refilled with fuel.

It is understood that in a departure from the versions shown in the drawings, a plurality of annular chambers 26, 26' may also be provided for refilling the hydraulic chamber 11. However, it has been found that in an alternative disposition of the annular chambers 26, 26' coaxially with the control piston 7 and the actuating piston 10, respectively, a continuous flow through the hydraulic chamber 11 is attained. This has the advantage that upon complete evacuation of the hydraulic chamber 11, for instance if there is a relatively long-lasting interruption in fuel injection, the air that has entered this chamber is removed again or flushed out.

In a further alternative version, the valve 1 of the invention can be equipped with only one valve seat. This has no influence on the advantageous refilling of the hydraulic chamber 11. It merely influences or changes the mode of operation of the valve 1.

What is claimed is:

1. A valve for controlling liquids, having a piezoelectric unit (3) for actuating a valve member (2), which is axially displaceable in a bore (8) of a valve body (9) and which has at least one control piston (7) and at least one actuating piston (10), wherein the valve member (2) is assigned a valve closing member (13), which cooperates with at least one valve seat (14, 15), provided on the valve body (9), for opening and closing the valve (1) and divides a low-pressure region (16) at system pressure from a high-pressure region (17), and having a hydraulic chamber (11) serving as a tolerance compensation element to compensate for elongation tolerances of the piezoelectric unit (3) and as a hydraulic step-up means, between the control piston (7) and the actuating piston (10), wherein to compensate for leakage losses, a conduit (24, 27), having a filling device (23), that communicates with the high-pressure region (17) is provided, which has a system pressure chamber (24, 26, 26') that discharges into a gap selected from the group consisting of a gap (25'), surrounding the actuating piston (10) and a gap (25) surrounding the control piston (7).

2. The valve for controlling liquids of claim 1, characterized in that the system pressure chamber is disposed in the valve body (9), and for supplying liquid the system pressure chamber (24, 26, 26') can be made to communicate fluidically with a valve control chamber (12) in the high-pressure region (17).

3. The valve for controlling liquids of claim 1, characterized in that the system pressure chamber is embodied with an annular conduit (26, 26'), which is disposed coaxially to the control piston (7) or to the actuating piston (10), and through the gap (25, 25') which surrounds the control piston (7), fitted into the bore (8), or the actuating piston (10), the hydraulic chamber (11) and the annular conduit (26, 26') communicate fluidically.

4. The valve for controlling liquids of claim 3, characterized in that the annular conduit (26) and the gap (25) surrounding the control piston (7) form a three-dimensional unit.

5. The valve for controlling liquids of claim 1, characterized in that the control piston (7), on its end face remote from the hydraulic chamber (11), is assigned a leak drainage chamber (20) defined by a sealing element (22).

6. The valve for controlling liquids of claim 1, characterized in that the valve closing member (13) is assigned a valve chamber (18) communicating with the system pressure chamber (24, 26, 26').

7. The valve for controlling liquids of claim 6, characterized in that the valve chamber (18) has a leak drainage conduit (19), in which a throttle (30) embodied as a damping device is disposed.

8. The valve for controlling liquids of claim 6, characterized in that the valve chamber (18) communicates with the system pressure chamber (24, 26, 26') via an overpressure valve (28) that sets the system pressure.

9. The valve for controlling liquids of claim 1, characterized in that the filling device (23) has a leakage pin (31), which can be made to communicate fluidically with the valve control chamber (12).

10. The valve for controlling liquids of claim 9, characterized in that the filling device (23) has a throttle bore, which can be made to communicate fluidically with the high-pressure region (17).

11. The valve for controlling liquids of claim 1, characterized by its use as a component of a fuel injection valve for internal combustion engines, in particular of a common rail injector (1).

* * * * *